(12) United States Patent
Wang et al.

(10) Patent No.: US 10,931,359 B2
(45) Date of Patent: Feb. 23, 2021

(54) METHOD AND APPARATUS FOR DETECTING BEAM

(71) Applicant: DATANG MOBILE COMMUNICATIONS EQUIPMENT CO.,LTD, Beijing (CN)

(72) Inventors: Shihua Wang, Beijing (CN); Tao Duan, Beijing (CN); Jingyan Ma, Beijing (CN); Jian Wu, Beijing (CN)

(73) Assignee: DATANG MOBILE COMMUNICATIONS Equipment CO., LTD, Beijing (CN)

( * ) Notice: Subject to any disclaimer, the term of this patent is extended or adjusted under 35 U.S.C. 154(b) by 0 days.

(21) Appl. No.: 16/606,735

(22) PCT Filed: Jan. 18, 2018

(86) PCT No.: PCT/CN2018/073232
§ 371 (c)(1),
(2) Date: Oct. 18, 2019

(87) PCT Pub. No.: WO2018/192282
PCT Pub. Date: Oct. 25, 2018

(65) Prior Publication Data
US 2020/0136709 A1    Apr. 30, 2020

(30) Foreign Application Priority Data
Apr. 18, 2017   (CN) .......................... 201710253987.1

(51) Int. Cl.
*H04B 7/06*    (2006.01)
(52) U.S. Cl.
CPC ......... *H04B 7/0695* (2013.01); *H04B 7/0617* (2013.01)

(58) Field of Classification Search
CPC ..................................................... H04B 7/0695
(Continued)

(56) References Cited

U.S. PATENT DOCUMENTS 5,870,681 A * 2/1999 Myer ..................... H01Q 1/246
343/895
2014/0185481 A1    7/2014 Seol et al.
(Continued)

FOREIGN PATENT DOCUMENTS

| CN | 103596245 A | 2/2014 |
| CN | 105897324 A | 8/2016 |
| CN | 106559122 A | 4/2017 |

OTHER PUBLICATIONS

The International Search Report for PCT Application No. PCT/CN2018/073232 dated Apr. 17, 2018, 4 pages.
(Continued)

*Primary Examiner* — Lihong Yu
(74) *Attorney, Agent, or Firm* — Womble Bond Dickinson (US) LLP

(57) ABSTRACT

Disclosed are a method and apparatus for detecting a beam, which are used for realizing accurate beam forming under a millimeter wave wireless communication system where antenna array calibration is carried out without using a calibration network in the millimeter wave wireless communication system. The method for detecting a beam provided in the present application comprises: determining a beam with a pre-set width; and using the beam with the pre-set width to scan a user equipment.

12 Claims, 4 Drawing Sheets

(58) Field of Classification Search
USPC .......................................................... 375/267
See application file for complete search history.

(56) References Cited

U.S. PATENT DOCUMENTS

| | | |
|---|---|---|
| 2015/0325912 A1 | 11/2015 | Liu |
| 2015/0341105 A1 | 11/2015 | Yu et al. |
| 2016/0212631 A1* | 7/2016 | Shen .................. H04W 56/001 |
| 2016/0380680 A1 | 12/2016 | Yang et al. |

OTHER PUBLICATIONS

The International Search Report and Written Opinion for PCT Application No. PCT/CN2018/073232 dated Apr. 17. 2018, 6 pages.
The Extended European Search Report for European Application No. 18788634 dated Feb. 24, 2020, 11 pages.
The International Preliminary Report on Patentability for PCT Application No. PCT/CN2018/073232 dated Oct. 22, 2019, 4 pages.

* cited by examiner

METHOD AND APPARATUS FOR DETECTING BEAM

CROSS REFERENCE TO RELATED APPLICATIONS

This patent application is a U.S. National Phase Application under 35 U.S.C. § 371 of International Application No. PCT/CN2018/073232, filed on Jan. 18, 2018, entitled METHOD AND APPARATUS FOR DETECTING BEAM, which claims the benefit and priority of Chinese Patent Application No. 201710253987.1, filed with the Chinese Patent Office on Apr. 18, 2017, and entitled "A method and apparatus for detecting a beam", which was incorporated by reference in its entirety.

FIELD

The present invention relates to the field of communications, and particularly to a method and apparatus for detecting a beam.

BACKGROUND

As the 5G wireless mobile communication technologies are developing rapidly, in order to improve the capacity of a wireless network, an array of antennas at a large scale, and the beam-forming technology have become one of the technologies enabling a 5G system. The traditional beam-forming and beam detecting technologies are applicable in a low frequency band of the 5G system, e.g., a frequency band below 6 GHz. In the beam-forming technology, a calibration signal shall be transmitted over a calibration network of the array of antennas to calibrate the system to thereby provide a uniform amplitudes and phase of a signal of the array of antennas so as to form a specific beam associated with a User Equipment (UE). In the existing system, an uplink detection signal transmitted by a mobile user equipment is received using a broadcast beam of the array of antennas, and the position of the user equipment is determined, a specific beam oriented to the user equipment is formed, and a high-speed communication connection is set up.

However the existing common antenna calibration solution, and uplink detection mechanism of a user equipment are only applicable to a communication system in a low frequency band (below 6 GHz), but not applicable to a system in a high frequency band, i.e., a millimeter wave system. This is primarily because the existing technical solution depends upon the calibration network of the array of antennas, and the calibration network is not applicable to the millimeter wave system primarily due to the following two reasons: firstly there is such a small antenna spacing for the millimeter wave system that there is no sufficient space to arrange the calibration network, and secondly there is so significant link attenuation in the millimeter wave system that even if a line travels over a short distance, then both the amplitude and the phase may significantly dither, so the desirable uniformity precision of the amplitude and the phase in the beam-forming technology may not be guaranteed.

SUMMARY

Embodiments of the invention provide a method and apparatus for detecting a beam so as to provide accurate beam-forming in a millimeter-wave wireless communication system even if an array of antennas is not calibrated over a calibration network in the millimeter-wave wireless communication system.

An embodiment of the invention provides a method for detecting a beam, the method including:
determining a beam with a preset width; and
scanning a user equipment using the beam with the preset width.

With this method, the beam with the preset width are determined, and the user equipment is scanned using the beam with the preset width, so that the preset beams with the fixed width can be used to thereby address the problem that an array of antennas cannot be calibrated over a calibration network in a millimeter wave wireless communication system, so as to perform accurate beam-forming in the millimeter wave wireless communication system.

Optionally, the determining the beam with the preset width includes: determining a beam with a first preset width.

Optionally, the scanning the user equipment using the beam with the preset width includes:
scanning the user equipment using an odd-indexed beam with the first preset width to obtain a plurality of groups of received signals, calculating an average power of each group of received signals, and determining two highest average powers Pm and Pn from average powers;
if a difference between Pm and Pn is above a preset threshold, determining an index of a beam with the first preset width, for performing a scan as index_step1=2m−1;
if a difference between Pm and Pn is below the preset threshold, and |m−n|=1, determining the index of a beam with the first preset width, for performing a scan as index_step1=m+n−1; and
if a difference between Pm and Pn is below the preset threshold, and |m−n|>1, determining an abnormal condition, and scanning the user equipment again using the beam with the preset width.

Optionally, the method further includes:
determining K=index_step1*5;
selecting the indexes of beams with a second preset width corresponding to a beam with the first preset width as [K−4, K−2, K, K+2, K+4] according to a value of K, wherein the first preset width is larger than the second preset width; and
scanning the user equipment using the beam with the second preset width corresponding to the indexes [K−4, K−2, K, K+2, K+4].

Optionally, the scanning the user equipment using the beams with the second preset width corresponding to the indexes [K−4, K−2, K, K+2, K+4] includes:
scanning the user equipment using the beams with the second preset width corresponding to the indexes [K−4, K−2, K, K+2, K+4], to obtain five groups of received signals, comparing average powers P1, P2, P3, P4. P5 of the five groups of received signals, and determining two highest average powers Pm and Pn from the average powers;
if a difference between Pm and Pn is above a preset threshold, determining the index of a beam with the second preset width, for performing a scan as index_step2=index (m);
if a difference between Pm and Pn is below the preset threshold, and |m−n|=1, determining the index of a beam with the second preset width, for performing a scan as index_step2=[index(m)+index(n)]/2; and
if a difference between Pm and Pn is below the preset threshold, and |m−n|>1, determining an abnormal condition, and scanning the user equipment again using the beams with the second preset width.

Optionally, the method further includes:
    determining a beam with the second preset width, corresponding to the index index_step2 as a beam for use in a millimeter wireless communication system in a downlink, and orienting the beam to a position of the user equipment for communication.

Optionally, presetting the beam with the first width includes: presetting five beams, with a first beam width of 60° at 3 dB, wherein the beams with the first preset width are indexed respectively with pw_1, pw_2, . . . , pw_5, and a beam center angle of pw_i is i*30°, wherein i=1, . . . , 5.

Optionally, presetting the beam with the second width includes: presetting 29 beams, with the second preset beam width of 12° at 3 dB, wherein the beams with the second preset width are indexed respectively with pn_1, pn_2, . . . , pn_29, and a beam center angle of pn_j is i*6°, wherein j=1, 2, . . . , 29.

An embodiment of the invention provides an apparatus for detecting a beam, the apparatus including:
    a first unit configured to determine a beam with a preset width; and a second unit configured to scan a user equipment using the beam with the preset width.

Optionally, the first unit is configured to determine beam with a first preset width.

Optionally, the second unit is configured:
    to scan the user equipment using an odd-indexed beam with the first preset width to obtain a plurality of groups of received signals, to calculate an average power of each group of received signal, and to determine two highest average power Pm and Pn from the average power;
    if a difference between Pm and Pn is above a preset threshold, to determine an index of a beam with the first preset width, for performing a scan as index_step1=2m−1;
    if a difference between Pm and Pn is below the preset threshold, and |m−n|=1, to determine the index of a beam with the first preset width, for performing a scan as index_step1=m+n−1; and
    if a difference between Pm and Pn is below the preset threshold, and |m−n|>1, to determine an abnormal condition, and to scan the user equipment again using the beam with the preset width.

Optionally, the second unit is further configured:
    to determine K=index_step1*5;
    to select indexes of beams with a second preset width corresponding to a beam with the first preset width as [K−4, K−2, K, K+2, K+4] according to a value of K, wherein the first preset width is larger than the second preset width; and
    to scan the user equipment using the beams with the second preset width corresponding to the indexes [K−4, K−2, K, K+2, K+4].

Optionally, the second unit is configured to scan the user equipment using the beams with the second preset width corresponding to the indexes [K−4, K−2, K, K+2. K+4] by:
    scanning the user equipment using the beams with the second preset width corresponding to the indexes [K−4, K−2, K, K+2, K+4] to obtain five groups of received signals, comparing averages power P1, P2, P3, P4, P5 of the five groups of signals, and determining two highest average powers Pm and Pn from the average power;
    if a difference between Pm and Pn is above a preset threshold, determining an index of a beam with the second preset width, for performing a scan as index_step2=index (m);
    if a difference between Pm and Pn is below the preset threshold, and |m−n|=1, determining the index of a beam with the second preset width, for performing a scan as index_step2=[index(m)+index(n)]/2; and if a difference between Pm and Pn is below the preset threshold, and |m−n|>1, determining an abnormal condition, and to scan the user equipment again using the beams with the second preset width.

Optionally, the second unit is further configured:
    to determine a beam with the second preset width, corresponding to the index index_step2 as a beam for use in a millimeter wireless communication system in a downlink, and to orient the beam to a position of the user equipment for communication.

Optionally, the first unit is further configured to preset the beam with the first preset width by: presetting five beams, with the first preset beam width of 60° at 3 dB, wherein the beams with the first width are indexed respectively with pw_1, pw_2, . . . , pw_5, and a beam center angle of pw_i is i*30°, wherein i=1, . . . , 5.

Optionally, the first unit is further configured to preset the beam with the second preset width by: presetting 29 beams, with the second preset beam width of 12° at 3 dB, wherein the beams with the second preset width are indexed respectively with pn_1, pn_2, . . . , pn_29, and a beam center angle of pn_j is i*6°, wherein j=1, 2, . . . , 29.

BRIEF DESCRIPTION OF THE DRAWINGS

In order to make the technical solutions according to the embodiments of the invention more apparent, the drawings to which reference is to be made in the description of the embodiments will be introduced below in brevity, and apparently the drawings to be described below only illustrate some embodiments of the invention, and those ordinarily skilled in the art can further derive other drawings from these drawings without any inventive effort.

DETAILED DESCRIPTION OF THE EMBODIMENTS

Figure 1:
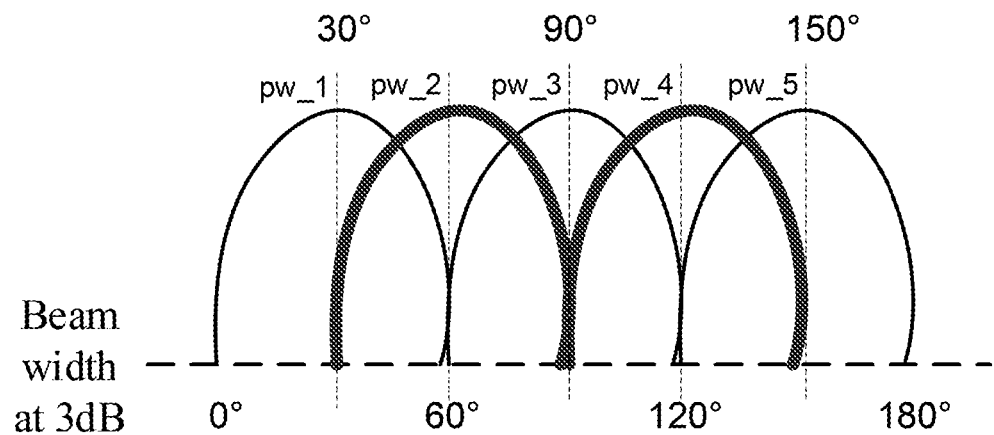
FIG. 1 is a schematic diagram of a wide-beam solution according to an embodiment of the invention.

The embodiments of the invention provide a method and apparatus for detecting a beam so as to provide accurate beam-forming in a millimeter-wave wireless communication system even if an array of antennas is not calibrated over a calibration network in the millimeter-wave wireless communication system.

The embodiments of the invention aim to address such a technical problem that a beam is oriented to a specific user equipment using the beam-forming technology of an array of antennas at a large scale in a 5G communication system to thereby shield interference so as to improve the capacity of the system. Accordingly the beam-forming technology applicable to the array of antennas at a large scale has become a technology enabling the system. However in order to apply the beam-forming technology in the Time Division Duplex (TDD) mode, the array of antennas shall be calibrated in real time, but it is difficult to apply the traditional calibration technology to a millimeter-wave wireless communication system primarily because there is such a small spacing between elements in the array of antennas that it is difficult to arrange a calibration network; and there is a significant link loss in a millimeter wave frequency band, and an amplitude-phase characteristic of the array of antennas at a large scale fluctuates dramatically, so it is difficult to guarantee the precision of calibration, and thus a valid beam can be neither formed nor oriented in effect to the specific user equipment, so that the capacity of the system cannot be greatly improved, and the system may fail. Accordingly it shall be considered how to apply the beam-forming technology in a millimeter-wave wireless communication system, or how to avoid the calibration network from being involved. Moreover how to detect and control a beam (uplink detection and downlink beam calibration of the user equipment) faces a significant challenge, and this technology has become one of important factors of hindering the millimeter-wave wireless communication system from being applied.

In this method according to the embodiment of the invention, there is no traditional calibration network in the millimeter-wave wireless communication system, but there is such a hybrid digital-analog beam-forming architecture that a fixed analog beam is applied so that even if there is no calibration network in a millimeter wave frequency band, then the beam-forming technology will be applied. More particularly the mobile user equipment can be detected in the uplink using a fixed beam (a wide beam), that is, a space domain is divided, and the user equipment is scanned using a beam with a predetermined width to thereby detect the user equipment. Once the user equipment is detected in the uplink, a fixed beam (a narrow beam) is further oriented to the user equipment for high-speed communication. The wide and narrow beams are preset and combined to thereby avoid the calibration network from being applied, reduce the number of scans, shorten a scan period of time, and update positional information of the user equipment in a timely manner so as to detect the mobile user equipment rapidly in the uplink, and to set up downlink communication.

For example, in order to detect the user equipment using the fixed scan beam, the antennas can be switched on and off for each scan and in order to detect the user equipment as quickly as possible, the number of scans shall be reduced as many as possible. For an array of micro-strip patch antennas including 64 elements (in 8 rows by 8 columns), for example, a beam width of the array at 3 dB is approximately 12°, and if a scan area ranging from 00 to 180° in the horizontal direction relative to the normal to the array is scanned using a beam at an interval of 6°, then the user equipment will be detected by performing at least 30 beam scans, where it takes 30 microseconds to switch a beam, so it will take 900 microseconds to perform this process sensitive to an error arising from the multi-path phenomenon. In the embodiment of the invention, an array of antennas at a large scale forms two beams including wide and narrow beams, and both of these two beams can be applied in combination for a beam in two steps to thereby greatly reduce the number of scans, detect in effect the mobile user equipment in the uplink, and provide some robustness to the multi-path phenomenon inherent in a radio propagation environment.

A particular solution according to the embodiment of the invention will be introduced below in details.

Firstly a space domain covered with the array of antennas at a large scale is beam-divided, and a series of wide and narrow beams are predefined, where all of these beams are fixed beams, and analog beam-forming can be performed without involving any calibration network. The defined wide and narrow beams are indexed respectively and stored in the system, and subsequently the indexes of corresponding beams can be invoked directly in a look-up table manner to thereby perform analog beam-forming.

The beams are categorized into wide and narrow beams in such a way that they lie in the range of 0° to 180° in the horizontal direction relative to the normal to the array of antennas, so that the space domain can be divided using a smaller number of beams, but also the user equipment can be detected precisely. The space domain can be divided particularly as follows.

Firstly a wide beam (pw) of the system is defined, a beam width of the wide beam at 3 dB is defined as 60°, and the range of 0° to 180° in the horizontal direction can be covered with at least three wide beams. As illustrated in FIG. 1, beams indexed with pw_1, pw_3, and pw_5 are elementary beams (represented as thin lines in FIG. 1), and beams indexed with pw_2 and pw_4 are interposed beams (represented as thick lines in FIG. 1) for standing against multi-path interference. Accordingly in the embodiment of the invention, five wide beams with a beam width of 60° at 3 dB are defined, and they are indexed with pw_1, pw_2, . . . , pw_5, where a beam center angle of pw_i is i*30° (i=1, . . . , 5).

Figure 2:
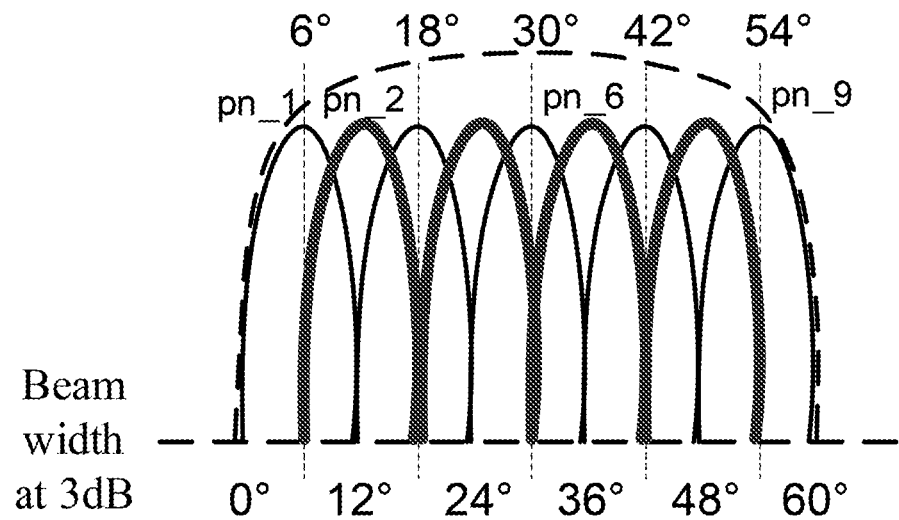
FIG. 2 is a schematic diagram of a narrow-beam solution according to an embodiment of the invention.

A narrow beam (pn) of the system is defined as follows: nine narrow beams with a beam width of 12° at 3 dB are nested in each wide beam as illustrated in FIG. 2, where odd-indexed beams pn_1, pn_3, . . . , pn_9 are elementary beams (represented as thin lines in FIG. 2), and beams indexed with pn_2, pn_4, . . . , pn_8 are interposed beams (represented as thick lines in FIG. 2) for detecting the user equipment precisely, and standing against multi-path interference. Accordingly in the embodiment of the invention, 29 narrow beams with a beam width of 12° at 3 dB are defined in the coverage area of all the wide beams, and they are indexed with pn_1, pn_2, . . . , pn_29, where a beam center angle of pn_j is j*60° (i=1, . . . , 29).

In the embodiment of the invention, the wide and narrow beams are defined as described above so that the mobile user equipment can be detected in the uplink without involving any complex antenna calibration or dynamic beam-forming technology in the prior art, and particularly can be detected as follows.

Figure 3:
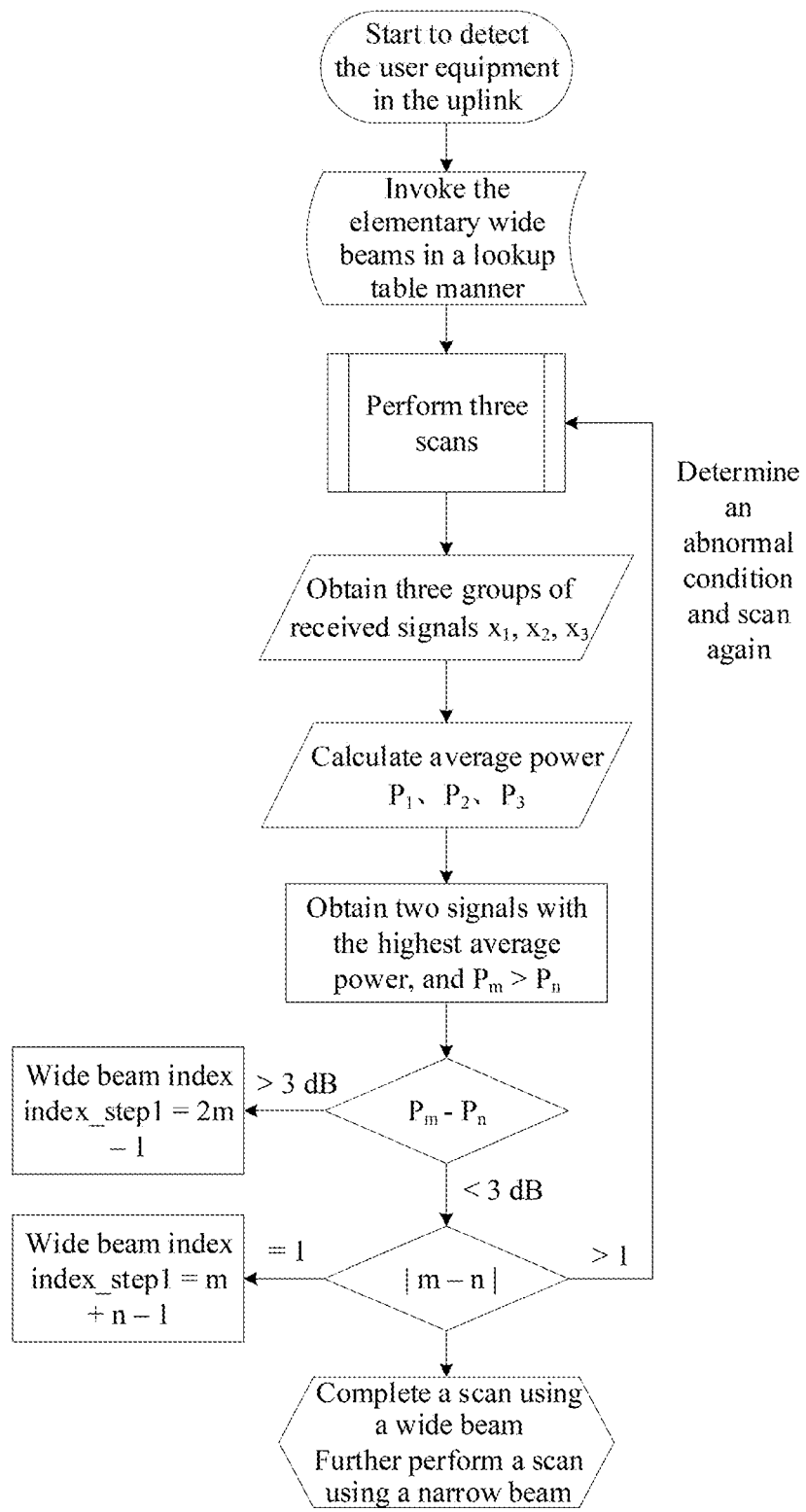
FIG. 3 is a schematic flow chart of uplink detection of a user equipment using fixed beams according to an embodiment of the invention.

The first step is to detect the user equipment in the uplink using a fixed beam, and particularly as illustrated in FIG. 3, a first scan is performed using a wide beam defined in the embodiment of the invention, three scans are performed using odd-indexed wide beams (elementary beams), i.e., pw_1, pw_3, pw_5, three received signals x1, x2, x3 are obtained, and average power P1, P2, P3 of these three groups of signals is calculated, so that two signals xm and xn with the highest average power can be determined, and Pm>Pn can be found, where Pm and Pn is the two highest average power among the average power P1, P2, P3, and the values of m and n range from 1 to 3.

If Pm−Pn>3 dB (or another particular value), then the index of a wide beam for performing a scan may be determined as index_step=2m−1, that is, the currently applied wide beam is a wide beam with an odd index.

If Pm−Pn<3 dB, and |m−n|=1, then in this case, the index of a wide beam will be determined as index_step1=m+n−1, so it can be decided to apply an interposed beam at present, i.e., a wide beam with an even index.

If Pm−Pn<3 dB, and |m−n|>1, then in this case, an abnormal condition will be determined, and a scan will be performed again using a wide beam.

Figure 4:
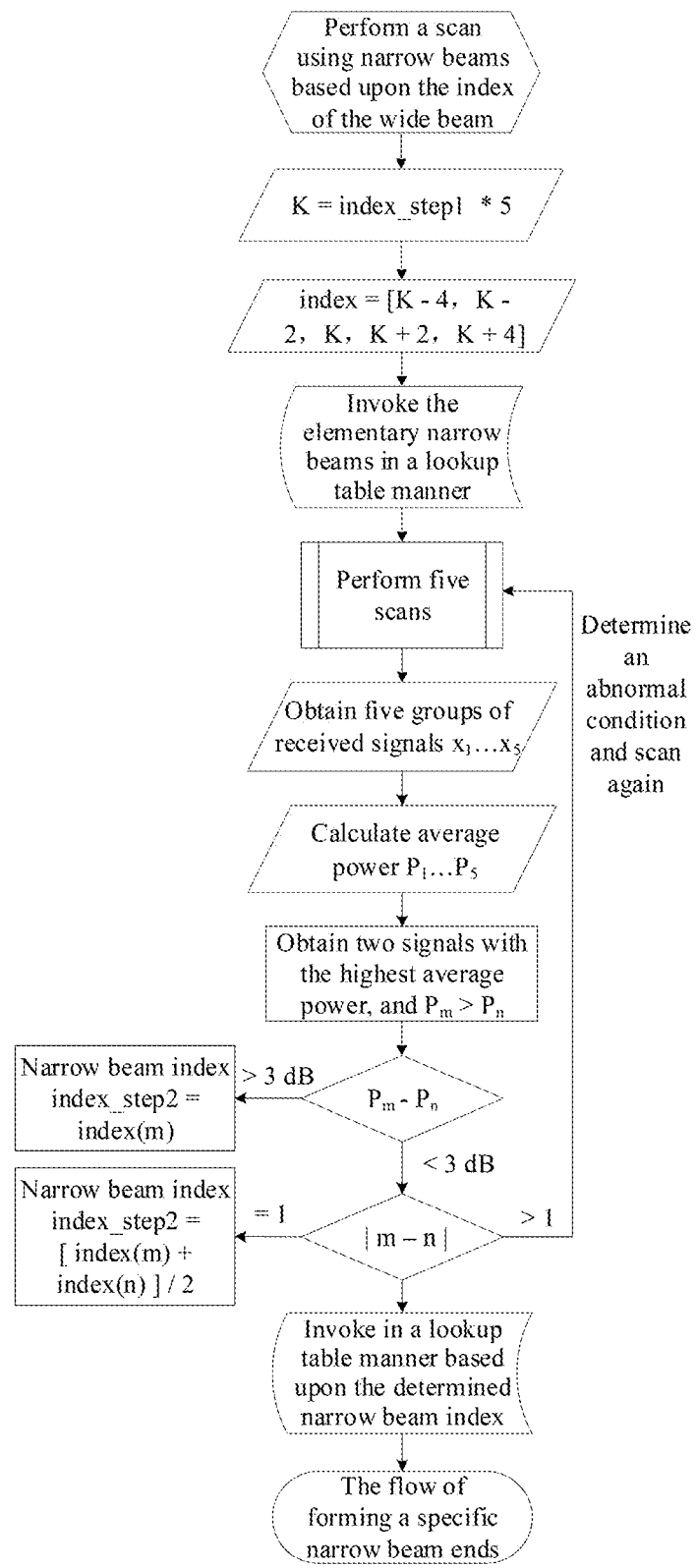
FIG. 4 is a schematic flow chart of uplink detection of a user equipment using fixed beams according to an embodiment of the invention.

As illustrated in FIG. 4, the step is, after the index of the wide beam for performing a scan is determined as index_step1, to determine K=index_step1*5, to select the indexes of narrow beams corresponding to the wide beam as [K−4, K−2, K, K+2, K+4] according to the index, to perform another five scans using the elementary beams among the narrow beams defined in the embodiment of the invention, to obtain five groups of received signals, to compare average power P1, P2, P3, P4, P5 of the five groups of signals, and to find two signals xm and xn with the highest average power, where Pm>Pn, Pm and Pn is the two highest average power among the average power P1, P2, P3, P4, P5, and the values of m and n range from 1 to 5.

If Pm−Pn>3 dB (or another particular value), then the index of a narrow beam for performing a scan may be determined as index_step2=index(m), i.e., a narrow beam with an odd index.

If Pm−Pn<3 dB, and |m−n|=1, then the index of a narrow beam for performing a scan may be determined as index_step2=[index(m)+index(n)]/2, i.e., an interposed narrow beam with an even index.

If Pm−Pn<3 dB, and |m−n|>1, then in this case, an abnormal condition will be determined, and a scan will be performed again using a narrow beam.

As illustrated in FIG. 4, the third step is to determine the narrow beam pn_index_step2 corresponding to the resulting index index_step2 as a beam for use in a millimeter wireless communication system in the downlink so that the narrow beam is oriented to the position of the user equipment to thereby achieve the highest gain, and improve the capacity of the system.

In summary, in the technical solution according to the embodiment of the invention, the precision of a horizontal scan in the space is normally 6°, and the user equipment can be detected in effect by performing only eight scans, so a general scan period of time can be saved by a factor of approximately 73%. Moreover in the method according to the embodiment of the invention, there is better robustness to an error arising from multi-path interference common in mobile communication. Stated otherwise, the embodiment of the invention proposes a method and control apparatus for beam-forming and detection using a beam of an array of antennas at a large scale in a millimeter wave wireless communication system even if there is no calibration network. The user equipment can be detected in the uplink using a combination of wide and narrow beams as described in the embodiment of the invention in a short period of time, there will be also good robustness to a multi-path effect, and the method and control apparatus can be widely applicable to a mobile communication device in a 5G high-frequency system.

Figure 5:
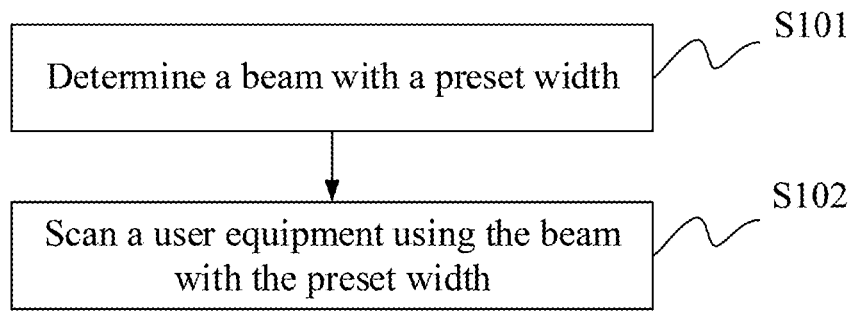
FIG. 5 is a schematic flow chart of a method for detecting a beam according to an embodiment of the invention.

Apparently as illustrated in FIG. 5, a method for detecting a beam according to an embodiment of the invention includes the following steps.

The step S101 is to determine beams with a preset width.

Optionally determining the beams with the preset width includes: determining beams with a first preset width.

The beams with the first width can be regarded as the wide beams above.

The step S102 is to scan a user equipment using the beams with the preset width.

Optionally scanning the user equipment using the beams with the preset width includes:

scanning the user equipment using odd-indexed beams with the first preset width, obtaining a plurality of groups of received signals, calculating average power of each group of received signal, and determining the two highest average power Pm and Pn among the average power;

if the difference between Pm and Pn is above a preset threshold, then determining the index of a beam with the first preset width, for performing a scan as index_step1=2m−1;

if the difference between Pm and Pn is below the preset threshold, and |m−n|=1, then determining the index of a beam with the first preset width, for performing a scan as index_step1=m+n−1; and if the difference between Pm and Pn is below the preset threshold, and |m−n|>1, then determining an abnormal condition, and scanning the user equipment again using the beams with the preset width.

Optionally the method further includes:
determining K=index_step1*5;
selecting the indexes of beams with a second preset width corresponding to a beam with the first preset width as [K−4, K−2, K, K+2, K+4] according to the value of K, where the first preset width is larger than the second preset width, and the beams with the second width can be regarded as the narrow beams above; and scanning the user equipment using the beams with the second preset width corresponding to the indexes [K−4, K−2, K, K+2, K+4].

Optionally scanning the user equipment using the beams with the second preset width corresponding to the indexes [K−4, K−2, K, K+2, K+4] includes:

scanning the user equipment using the beams with the second preset width corresponding to the indexes [K−4, K−2, K, K+2, K+4], obtaining five groups of received signals, compare average power P1, P2, P3, P4, P5 of the five groups of signals, and determining the two highest average power Pm and Pn among the average power;

if the difference between Pm and Pn is above a preset threshold, then determining the index of a beam with the second preset width, for performing a scan as index_step2=index(m);

if the difference between Pm and Pn is below the preset threshold, and |m−n|=1, then determining the index of a beam with the second preset width, for performing a scan as index_step2=[index(m)+index(n)]/2; and if the difference between Pm and Pn is below the preset threshold, and |m−n|>1, then determining an abnormal condition, and scanning the user equipment again using the beams with the second preset width.

Optionally the method further includes:
determining a beam, with the second preset width, corresponding to the resulting index index_step2 as a beam for use in a millimeter wireless communication system in the downlink, and orienting the narrow beam to the position of the user equipment for communication.

Optionally presetting the beams with the first width includes presetting five beams, with the first beam width of 60° at 3 dB, where the respective beams with the first width are indexed respectively with pw_1, pw_2, . . . , pw_5, and a beam center angle of pw_i is i*30°, where i=1, . . . , 5.

Optionally presetting the beams with the second width includes: presetting 29 beams, with the second beam width of 12° at 3 dB, where the respective beams with the second width are indexed respectively with pn_1, pn_2, ..., pn_29, and a beam center angle of pn_j is i*6, where j=1, 2, ..., 29.

Figure 6:
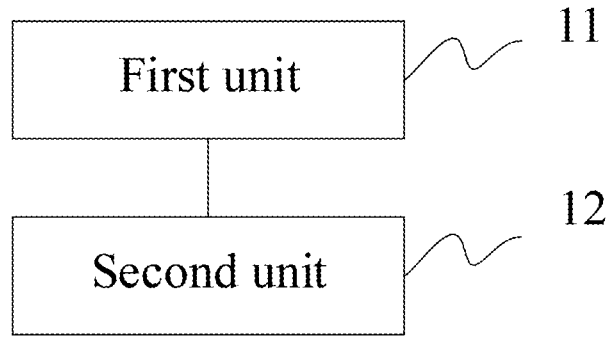
FIG. 6 is a schematic structural diagram of an apparatus for detecting a beam according to an embodiment of the invention.

In correspondence to the method above, as illustrated in FIG. 6, an apparatus for detecting a beam according to an embodiment of the invention includes:

a first unit 11 is configured to determine beams with a preset width; and a second unit 12 is configured to scan a user equipment using the beams with the preset width.

Optionally the first unit is configured to determine beams with a first preset width.

Optionally the second unit is configured:

to scan the user equipment using odd-indexed beams with the first preset width, to obtain a plurality of groups of received signals, to calculate average power of each group of received signal, and to determine the two highest average power Pm and Pn among the average power, if the difference between Pm and Pn is above a preset threshold, to determine the index of a beam with the first preset width, for performing a scan as index_step1=2m−1;

if the difference between Pm and Pn is below the preset threshold, and |m−n|=1, to determine the index of a beam with the first preset width, for performing a scan as index_step1=m+n−1; and if the difference between Pm and Pn is below the preset threshold, and |m−n|>1, to determine an abnormal condition, and to scan the user equipment again using the beams with the preset width.

Optionally the second unit is further configured:

to determine K=index_step1*5;

to select the indexes of beams with a second preset width corresponding to a beam with the first preset width as [K−4, K−2, K, K+2, K+4] according to the value of K, where the first preset width is larger than the second preset width; and to scan the user equipment using the beams with the second preset width corresponding to the indexes [K−4, K−2, K, K+2, K+4].

Optionally the second unit configured to scan the user equipment using the beams with the second preset width corresponding to the indexes [K−4, K−2, K, K+2, K+4] is configured:

to scan the user equipment using the beams with the second preset width corresponding to the indexes [K−4, K−2, K, K+2, K+4], to obtain five groups of received signals, to compare average power P1, P2, P3, P4, P5 of the five groups of signals, and to determine the two highest average power Pm and Pn among the average power;

if the difference between Pm and Pn is above a preset threshold, to determine the index of a beam with the second preset width, for performing a scan as index_step2=index (m);

if the difference between Pm and Pn is below the preset threshold, and |m−n|=1, to determine the index of a beam with the second preset width, for performing a scan as index_step2=[index(m)+index(n)]/2; and if the difference between Pm and Pn is below the preset threshold, and |m−n|>1, to determine an abnormal condition, and to scan the user equipment again using the beams with the second preset width.

Optionally the second unit is further configured:

to determine a beam with the second preset width, corresponding to the resulting index index_step2 as a beam for use in a millimeter wireless communication system in the downlink, and to orient the narrow beam to the position of the user equipment for communication.

Optionally the first unit configured to preset the beams with the first width is further configured to preset five beams, with the first beam width of 60° at 3 dB, where the respective beams with the first width are indexed respectively with pw_1, pw_2, ..., pw_5, and a beam center angle of pw_i is i*30°, where i=1, ..., 5.

Optionally the first unit configured to preset the beams with the second width is further configured to preset 29 beams, with the second beam width of 12° at 3 dB, where the respective beams with the second width are indexed respectively with pn_1, pn_2, ..., pn_29, and a beam center angle of pn_j is i*6°, where j=1, 2, ..., 29.

Both the first unit and the second unit can be embodied as a processor or another physical device.

Figure 7:
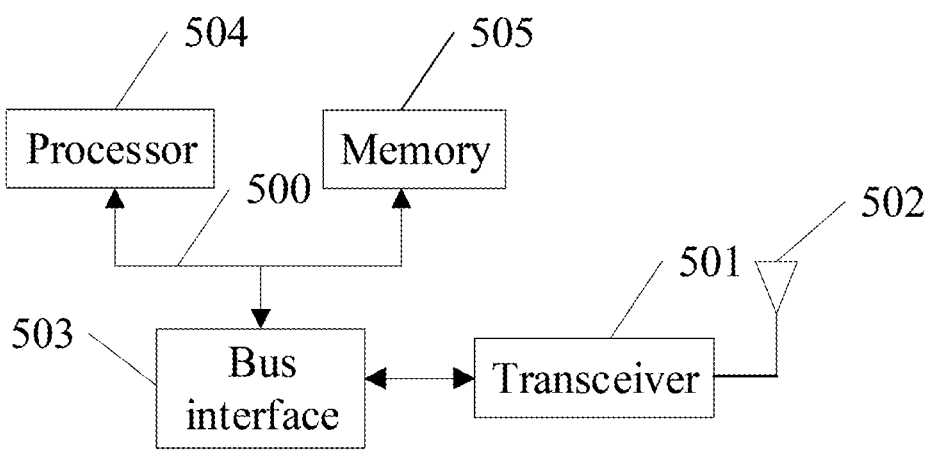
FIG. 7 is a schematic structural diagram of another apparatus for detecting a beam according to an embodiment of the invention.

As illustrated in FIG. 7, another apparatus for detecting a beam according to an embodiment of the invention includes:

a processor 504 is configured to read and execute program in a memory 505:

to determine beams with a preset width; and to scan a user equipment using the beams with the preset width.

Optionally the processor 504 is configured to determine the beams with the preset width by determining beams with a first preset width.

Optionally the processor 504 is configured to scan the user equipment using the beams with the preset width by:

scanning the user equipment using odd-indexed beams with the first preset width, to obtain a plurality of groups of received signals, calculating average power of each group of received signal, and determining the two highest average power Pm and Pn among the average power;

if the difference between Pm and Pn is above a preset threshold, determining the index of a beam with the first preset width, for performing a scan as index_step1=2m−1;

if the difference between Pm and Pn is below the preset threshold, and |m−n|=1, determining the index of a beam with the first preset width, for performing a scan as index_step1=m+n−1; and if the difference between Pm and Pn is below the preset threshold, and |m−n|>1, determining an abnormal condition, and to scan the user equipment again using the beams with the preset width.

Optionally the processor 504 is further configured:

to determine K=index_step1*5;

to select the indexes of beams with a second preset width corresponding to a beam with the first preset width as [K−4, K−2, K, K+2, K+4] according to the value of K, where the first preset width is larger than the second preset width; and to scan the user equipment using the beams with the second preset width corresponding to the indexes [K−4, K−2, K, K+2, K+4].

Optionally the processor 504 is configured to scan the user equipment using the beams with the second preset width corresponding to the indexes [K−4, K−2, K, K+2, K+4] by:

scanning the user equipment using the beams with the second preset width corresponding to the indexes [K−4, K−2, K, K+2, K+4], to obtain five groups of received signals, comparing average power P1, P2, P3, P4, P5 of the five groups of signals, and determining the two highest average power Pm and Pn among the average power;

if the difference between Pm and Pn is above a preset threshold, determining the index of a beam with the second preset width, for performing a scan as index_step2=index (m);

if the difference between Pm and Pn is below the preset threshold, and |m−n|=1, determining the index of a beam with the second preset width, for performing a scan as index_step2=[index(m)+index(n)]/2; and if the difference between Pm and Pn is below the preset threshold, and |m−n|>1, determining an abnormal condition, and to scan the user equipment again using the beams with the second preset width.

Optionally the processor 504 is further configured:

to determine a beam with the second preset width, corresponding to the resulting index index_step2 as a beam for use in a millimeter wireless communication system in the downlink, and to orient the narrow beam to the position of the user equipment for communication.

Optionally the processor 504 is configured to preset the beams with the first width is further configured to preset five beams, with the first beam width of 60° at 3 dB, where the respective beams with the first width are indexed respectively with pw_1, pw_2, ..., pw_5, and a beam center angle of pw_i is i*30°, where i=1, ..., 5.

Optionally the processor 504 configured to preset the beams with the second width is further configured to preset 29 beams, with the second beam width of 12° at 3 dB, where the respective beams with the second width are indexed respectively with pn_1, pn_2, ..., pn_29, and a beam center angle of pn_j is i*6°, where j=1, 2, ..., 29.

The transceiver 501 is configured to transmit and receive data under the control of the processor 504.

In FIG. 7, the bus architecture (represented by the bus 500) can include any number of interconnecting buses and bridges to particularly link together various circuits including one or more processors represented by the processor 504, and one or more memories represented by the memory 505. The bus 500 can further link together various other circuits, e.g., a peripheral device, a manostat, a power management circuit, etc., all of which are well known in the art, so a further description thereof will be omitted in this context. The bus interface 503 serves as an interface between the bus 500 and the transceiver 501. The transceiver 501 can be an element, or can be a number of elements, e.g., a transmitter and a receiver, which are units for communication with various other devices over a transmission medium. Data processed by the processor 504 are transmitted over a radio medium through the antenna 502, and furthermore the antenna 502 further receives and transports data to the processor 504.

The processor 504 is responsible for managing the bus 500 and performing normal processes, and can further provide various functions including timing, a peripheral interface, voltage regulation, power source management, and other control functions, and the memory 505 can store data for use by the processor 504 in performing the operations.

Optionally the processor 504 can be a Central Processing Unit (CPU), an Application-Specific Integrated Circuit (ASIC), a Field-Programmable Gate Array (FPGA), a Complex Programmable Logic Device (CPLD), or a Digital Signal Processor (DSP).

In summary, in the embodiments of the invention, the wide and narrow beams are defined, where there are the elementary waves, the interposed beams, etc., as illustrated in FIG. 1 and FIG. 2; and the method for detecting a user equipment in the uplink according to the embodiment of the invention can be applicable to a communication system in a high frequency band, where the user equipment can be detected using the wide and narrow beams in combination as illustrated in FIG. 3 and FIG. 4. The method for detecting a user equipment in the uplink, and determining a beam for downlink communication according to the embodiment of the invention can be embodied in a communication base station system, and performed as an apparatus for controlling a beam to thereby address the problem that beam-forming cannot be performed over a calibration network in a millimeter wave frequency band. The method and control apparatus for detecting a beam according to the embodiments of the invention generally have the following several advantages over the prior art: the method for detecting a user equipment in the uplink using fixed beams according to the embodiment of the invention can address such a technical problem that an array of antennas cannot be calibrated over a calibration network in a millimeter wave communication system, and thus accurate beam-forming cannot be performed. In the scan and detection method using the wide and narrow beams according to the embodiment of the invention, the number of scans can be reduced in effect, and the amount of time can be saved by a factor of approximately 73%, as compared with the all-scan method in the prior art, while guaranteeing some precision; and In the method using the elementary beams and the interposed beams in combination according to the embodiment of the invention, robustness to multi-path interference can be improved in effect without increasing the number of scans. In the method of beam-forming using fixed beams according to the embodiment of the invention, analog beam-forming can be performed in a look-up table manner to thereby perform analog beam-forming in the communication system without increasing the complexity of calculation in the system, thus making it convenient to perform the method algorithmically.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for detecting a beam, the method comprising:
   determining a beam with a preset width; and
   scanning a user equipment using the beam with the preset width;
   the determining the beam with the preset width comprises: determining a beam with a first preset width;
   the scanning the user equipment using the beam with the preset width comprises:
   scanning the user equipment using an odd-indexed beam with the first preset width to obtain a plurality of groups of received signals, calculating an average power of each group of received signals, and determining two highest average powers Pm and Pn from average powers;
   if a difference between Pm and Pn is above a preset threshold, determining an index of a beam with the first preset width, for performing a scan as index_step1=2m−1;
   if a difference between Pm and Pn is below the preset threshold, and |m−n|=1, determining the index of a beam with the first preset width, for performing a scan as index_step1=m+n−1; and
   if a difference between Pm and Pn is below the preset threshold, and |m−n|>1, determining an abnormal condition, and scanning the user equipment again using the beam with the preset width; m is an integer greater than 1 and less than or equal to the number of the scanning the user equipment using an odd-indexed beam with the first preset width, and n is an integer greater than 1 and less than or equal to the number of the scanning the user equipment using an odd-indexed beam with the first preset width.

2. The method according to claim 1, wherein the method further comprises:
   determining K=index_step1*5;
   selecting the indexes of beams with a second preset width corresponding to a beam with the first preset width as [K−4, K−2, K, K+2, K+4] according to a value of K, the first preset width being larger than the second preset width; and
   scanning the user equipment using the beam with the second preset width corresponding to the indexes [K−4, K−2, K, K+2, K+4].

3. The method according to claim 2, wherein the scanning the user equipment using the beams with the second preset width corresponding to the indexes [K−4, K−2, K, K+2, K+4] comprises:
   scanning the user equipment using the beams with the second preset width corresponding to the indexes [K−4, K−2, K, K+2, K+4], to obtain five groups of received signals, comparing average powers P1, P2, P3, P4, P5 of the five groups of received signals, and determining two highest average powers Pm and Pn from the average powers;
   if a difference between Pm' and Pn' is above a preset threshold, determining the index of a beam with the second preset width, for performing a scan as index_step2=index(m');
   if a difference between Pm' and Pn' is below the preset threshold, and |m'−n'|=1, determining the index of a beam with the second preset width, for performing a scan as index_step2=[index(m')+index(n')]/2; and
   if a difference between Pm' and Pn' is below the preset threshold, and |m'−n'|>1, determining an abnormal condition, and scanning the user equipment again using the beams with the second preset width; m' is an integer greater than 1 and less than or equal to the number of the scanning the user equipment using the beams with the second preset width, and n' is an integer greater than 1 and less than or equal to the number of the scanning the user equipment using the beams with the second preset width.

4. The method according to claim 3, further comprises:
   determining a beam with the second preset width, corresponding to the index index_step2 as a beam for use in a millimeter wireless communication system in a downlink, and orienting the beam to a position of the user equipment for communication.

5. The method according to claim 1, wherein presetting the beam with the first preset width comprises: presetting five beams, with a first beam width of 60° at 3 dB, the beams with the first preset width are indexed respectively with pw_1, pw_2, . . . , pw_5, and a beam center angle of pw_i is i*30°, and i=1, . . . , 5.

6. The method according to claim 2, wherein presetting the beam with the second preset width comprises: presetting 29 beams, with the second preset beam width of 12° at 3 dB, the beams with the second preset width are indexed respectively with pn_1, pn_2, . . . , pn_29, and a beam center angle of pn_j is i*6°, and j=1, 2, . . . , 29.

7. An apparatus for detecting a beam, the apparatus comprising a non-transitory memory configured to store a computer readable program, and a processor configured to execute the computer readable program to:
   determine a beam with a preset width; and
   scan a user equipment using the beam with the preset width;
   the processor is configured to execute the computer readable program to determine a beam with a first preset width;
   the processor is configured to execute the computer readable program to:
   scan the user equipment using an odd-indexed beam with the first preset width to obtain a plurality of groups of received signals, to calculate an average power of each group of received signal, and to determine two highest average power Pm and Pn from the average power;

if a difference between Pm and Pn is above a preset threshold, determine an index of a beam with the first preset width, for performing a scan as index_step1=2m−1;

if a difference between Pm and Pn is below the preset threshold, and |m−n|=1, determine the index of a beam with the first preset width, for performing a scan as index_step1=m+n−1; and if a difference between Pm and Pn is below the preset threshold, and |m−n|>1, determine an abnormal condition, and to scan the user equipment again using the beam with the preset width; m is an integer greater than 1 and less than or equal to the number of the scanning the user equipment using an odd-indexed beam with the first preset width, and n is an integer greater than 1 and less than or equal to the number of the scanning the user equipment using an odd-indexed beam with the first preset width.

8. The apparatus according to claim 7, wherein the processor is configured to execute the computer readable program to:

determine K=index_step1*5;

select indexes of beams with a second preset width corresponding to a beam with the first preset width as [K−4, K−2, K, K+2, K+4] according to a value of K, the first preset width being larger than the second preset width; and scan the user equipment using the beams with the second preset width corresponding to the indexes [K−4, K−2, K, K+2, K+4].

9. The apparatus according to claim 8, wherein the processor is configured to execute the computer readable program to scan the user equipment using the beams with the second preset width corresponding to the indexes [K−4, K−2, K, K+2, K+4] by:

scanning the user equipment using the beams with the second preset width corresponding to the indexes [K−4, K−2, K, K+2, K+4] to obtain five groups of received signals, comparing averages power P1, P2, P3, P4, P5 of the five groups of signals, and determining two highest average powers Pm' and Pn' from the average power;

if a difference between Pm' and Pn' is above a preset threshold, determining an index of a beam with the second preset width, for performing a scan as index_step2=index(m');

if a difference between Pm and Pn is below the preset threshold, and |m−n'|=1, determining the index of a beam with the second preset width, for performing a scan as index_step2=[index(m')+index(n')]/2; and if a difference between Pm' and Pn' is below the preset threshold, and |m'−n'|>1, determining an abnormal condition, and to scan the user equipment again using the beams with the second preset width; m' is an integer greater than 1 and less than or equal to the number of the scanning the user equipment using the beams with the second preset width, and n' is an integer greater than 1 and less than or equal to the number of the scanning the user equipment using the beams with the second preset width.

10. The apparatus according to claim 9, wherein the processor is configured to execute the computer readable program to:

determine a beam with the second preset width, corresponding to the index index_step2 as a beam for use in a millimeter wireless communication system in a downlink, and orient the beam to a position of the user equipment for communication.

11. The apparatus according to claim 7, wherein the processor is configured to execute the computer readable program to preset the beam with the first preset width by: presetting five beams, with the first preset beam width of 60° at 3 dB, the beams with the first width are indexed respectively with pw_1, pw_2, . . . , pw_5, and a beam center angle of pw_i is i*30°, and i=1, . . . , 5.

12. The apparatus according to claim 8, wherein the processor is configured to execute the computer readable program to preset the beam with the second preset width by: presetting 29 beams, with the second preset beam width of 12° at 3 dB, the beams with the second preset width are indexed respectively with pn_1, pn_2, . . . , pn_29, and a beam center angle of pn_j is i*6°, and j=1, 2, . . . , 29.

* * * * *